(12) United States Patent
Kaftan et al.

(10) Patent No.: US 9,697,586 B2
(45) Date of Patent: Jul. 4, 2017

(54) METHOD AND APPARATUS FOR GENERATING AN ENHANCED IMAGE FROM MEDICAL IMAGING DATA

(71) Applicants: Jens Kaftan, Oxford (GB); Matthew David Kelly, Botley (GB); Guenther Platsch, Roenthenbach (DE)

(72) Inventors: Jens Kaftan, Oxford (GB); Matthew David Kelly, Botley (GB); Guenther Platsch, Roenthenbach (DE)

(73) Assignees: Siemens Aktiengesellschaft, Munich (DE); Siemens Medical Solutions USA, Inc., Malvern, PA (US)

( * ) Notice: Subject to any disclaimer, the term of this patent is extended or adjusted under 35 U.S.C. 154(b) by 522 days.

(21) Appl. No.: 13/650,284

(22) Filed: Oct. 12, 2012

(65) Prior Publication Data
US 2013/0101197 A1    Apr. 25, 2013

(30) Foreign Application Priority Data
Oct. 14, 2011    (GB) .................................. 1117805.0

(51) Int. Cl.
*G06K 9/00*    (2006.01)
*G06T 5/00*    (2006.01)
*G06T 7/00*    (2017.01)

(52) U.S. Cl.
CPC .............. *G06T 5/00* (2013.01); *G06T 7/0012* (2013.01); *G06T 2207/10104* (2013.01); *G06T 2207/30008* (2013.01); *G06T 2207/30172* (2013.01)

(58) Field of Classification Search
CPC ............ G06T 2207/30008; G06T 2207/30172

USPC ................................................... 382/128, 131
See application file for complete search history.

(56) References Cited

U.S. PATENT DOCUMENTS

| | | | | |
|---|---|---|---|---|
| 7,627,159 | B2 * | 12/2009 | Kiraly et al. ................. | 382/131 |
| 2002/0168110 | A1 * | 11/2002 | Al-Kofahi et al. ........... | 382/199 |
| 2003/0095120 | A1 | 5/2003 | Koppe et al. | |
| 2004/0161140 | A1 * | 8/2004 | Yuzefovich et al. ......... | 382/131 |
| 2006/0036167 | A1 * | 2/2006 | Shina ....................... | A61B 6/12 |
| | | | | 600/433 |
| 2007/0110295 | A1 * | 5/2007 | Shen et al. ..................... | 382/131 |
| 2007/0249910 | A1 * | 10/2007 | Kiraly et al. ................. | 600/300 |
| 2008/0107318 | A1 * | 5/2008 | Kiraly ........................... | 382/131 |
| 2008/0137932 | A1 * | 6/2008 | Shen et al. ..................... | 382/131 |
| 2008/0242968 | A1 * | 10/2008 | Claus ..................... | A61B 6/032 |
| | | | | 600/407 |

(Continued)

FOREIGN PATENT DOCUMENTS

WO    WO 2006050102 A2 *  5/2006   ............. G06T 17/40

OTHER PUBLICATIONS

Sowmya Ramakrishnan et al., "Automatic Three-Dimensional Rib Centerline Extraction from CT Scans for Enhanced Visualization and Anatomical Context", Proc. SPIE Medical Imaging 2011: Image Processing, vol. 7962, Mar. 14, 2011, pp. 1-12.*

(Continued)

*Primary Examiner* — Gandhi Thirugnanam
(74) *Attorney, Agent, or Firm* — Schiff Hardin LLP

(57) ABSTRACT

In a method and apparatus for generating an enhanced image for display from medical imaging data of a subject, a feature of interest in the imaging data elongated in at least one dimension is determined. A location of a line through the imaging data along the feature of interest is obtained, and a projection image along the line is generated from the imaging data.

16 Claims, 9 Drawing Sheets

(56) References Cited

U.S. PATENT DOCUMENTS

| | | | | |
|---|---|---|---|---|
| 2008/0317322 | A1* | 12/2008 | Acharyya | G06T 7/0012 382/132 |
| 2009/0310847 | A1* | 12/2009 | Matsuzaki | A61B 6/12 382/132 |
| 2010/0040263 | A1* | 2/2010 | Li | G06T 5/009 382/128 |
| 2010/0046814 | A1* | 2/2010 | Dewaele | G06T 7/0012 382/128 |
| 2010/0054562 | A1* | 3/2010 | Berkus | G06T 5/002 382/131 |
| 2010/0239140 | A1* | 9/2010 | Ruijters et al. | 382/130 |
| 2010/0316272 | A1* | 12/2010 | Kadir | G06T 15/08 382/128 |
| 2012/0093383 | A1* | 4/2012 | Claus | A61B 6/032 382/131 |
| 2012/0106810 | A1* | 5/2012 | Ramakrishnan et al. | 382/128 |
| 2012/0177258 | A1* | 7/2012 | Hakl et al. | 382/128 |
| 2013/0070996 | A1* | 3/2013 | Liu et al. | 382/131 |
| 2013/0077841 | A1* | 3/2013 | Wu et al. | 382/131 |
| 2013/0101197 | A1* | 4/2013 | Kaftan et al. | 382/131 |
| 2015/0093008 | A1* | 4/2015 | Kaftan | G06T 7/0032 382/131 |
| 2015/0131881 | A1* | 5/2015 | Gnanamani | G06T 7/0012 382/131 |

OTHER PUBLICATIONS

A. Kiraly, et al. "A novel visualization method for the ribs within chest volume data", Mar. 10, 2006, Proc SPIE Medical Imaging 2005: Image-Guided Procedures and Display, vol. 6141, pp. 1-8.*

J. Yao et al., "Sclerotic Rib Metastases Detection on Routine CT Images", 2012, Biomedical Imaging 2012, pp. 1767-1770.*

S. Ramakrishnan and C. Alvino, "An Automatic Method for Rib Ordering and Pairing in 3D Medical Images", Apr. 2, 2011, Biomedical Imaging: From Nano to Macro, 2011 IEEE International Symposium on, pp. 1201-1204.*

* cited by examiner

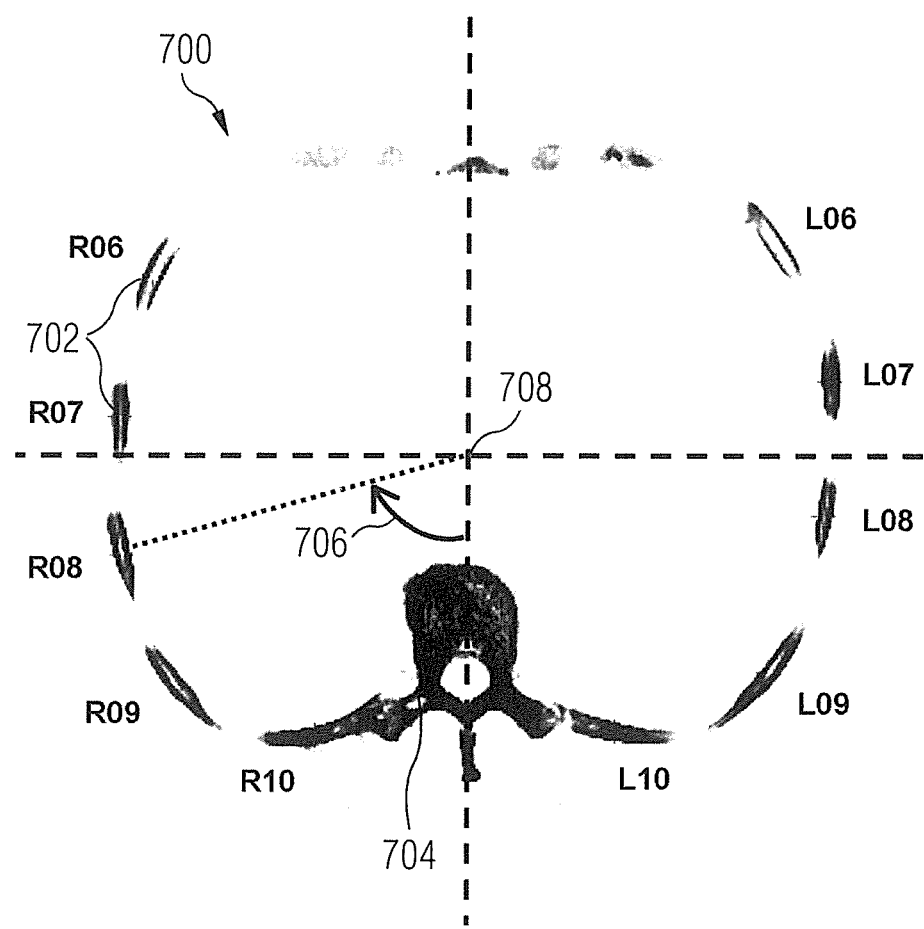

METHOD AND APPARATUS FOR GENERATING AN ENHANCED IMAGE FROM MEDICAL IMAGING DATA

BACKGROUND OF THE INVENTION

Field of the Invention

This invention is directed to a method and apparatus for generating an enhanced image for display from medical imaging data of a subject, in particular for elongated features of interest in an image volume.

Description of the Prior Art

The definition of regions or volumes of interest (ROI/VOI) is a typical precursor to quantitative analysis of medical images, such as nuclear medicine emission images (for example, PET or SPECT). Such regions may be defined around areas of high intensity which correspond to high tracer uptake (hotspots). For example, in FDG-PET images for oncology, such areas may be indicative of the presence of a tumor. Oncology physicians frequently annotate lesions in PET scans for the purpose of making a diagnosis, or for use in radiotherapy. The mean or maximum tracer uptake can aid a reader in determining the likelihood of cancer. In longitudinal studies, considering the change in intensity or uptake on corresponding VOIs from images at different temporal stages may be used to determine whether a tumor has regressed.

In oncology the identification, diagnosis, follow-up, and reporting of lesions are key steps in the clinical routine. Bone metastases (in the ribs and spine, for example) occur in many cancer types. The PET tracer F-18 sodium fluoride (18F—NaF), which features an increased uptake in osteolytic and osteoblastic bone lesions, can be used for imaging bone lesions. It has been shown that twice as many benign as well as malignant lesions will be visualized on 18F—NaF PET bone imaging versus conventional 99 mTc phosphonate SPECT or planar imaging. As a consequence, 18F—NaF PET results changed clinical management in about 18% of patients.

The detection and reporting of bone lesions can be cumbersome, particularly for patients with multiple lesions or wide-spread metastases. As a consequence, the manual detection and reporting of bone lesions is often time consuming and hence also prone to errors. In case of multiple lesions, e.g., at different locations along different ribs, the individual locations are frequently not properly documented due to time restrictions in clinical routine.

PET/SPECT bone scans are typically read on either a slice-by-slice basis (axial, coronal, sagittal) or by means of 3D MIPs. Each finding then needs to be manually reported (left/right rib, rib number, position along rib). However, after identification of a lesion along a particular rib, this information needs to be manually obtained by, e.g., counting the ribs visible in the 3D volume. As a consequence, detailed reporting of many lesions can be time-consuming and is often avoided for cases with multiple lesions. For follow-up examinations, the 3D volume data can be either visually compared or the different scans can be aligned to each other (e.g., using a registration algorithm). However, an automatic registration might be error-prone if the local morphology has significantly changed, e.g., due to therapy or disease progression. Moreover, quantitative comparison between different lesions is only possible if these lesions have actually been reported.

Using CT imaging only, WO 2006/050102 proposed a 2D visualization technique, in the following referred to as "rib unfolding", which improves the detectability of rib lesions. To this end, the centerline of each rib is extracted. Then, for each rib a 2D projection of its centerline (often also referred to as "curved planar reformation" (CPR)) is visualized. Coupling this technique with rib labelling, lesions and corresponding rib information (left/right rib, rib number) can be identified and used for reporting.

An example of this technique is shown in FIG. 1, illustrating an example system using CT-based rib unfolding. In the top left frame (100), the unfolded ribs (102) are visualized in 2D incl. rib labels whereas the top right frame (104) shows a cross-sectional MPR to the currently selected rib (106) position. The traditional MPR views (axial, coronal, sagittal —108, 110, 112) are shown at the bottom.

However, using CT imaging only, rib lesions are often hard to detect as they may lack contrast to normal ribs and also may appear darker or brighter than healthy bone. As a consequence, each rib still requires carefully examination using the rib unfolded view in combination with traditional MPR images.

SUMMARY OF THE INVENTION

An object of the present invention is to address the above-described problems and to provide improvements upon the known devices and methods.

In general terms, one embodiment of the invention is a method for generating an enhanced image for display from medical imaging data of a subject, which includes the steps of: determining a feature of interest in the imaging data elongated in at least one dimension, obtaining a location of a line through the imaging data along the feature of interest, and generating from the imaging data a projection image along this line.

The method allows a simple, automatic and direct means for identifying any anomalies, such as lesions, along elongated features of interest in the imaging data, such as ribs.

Suitably, the projection image is a two-dimensional, maximum intensity projection image.

Preferably, the line is a centerline along the feature of interest. In embodiments, the feature of interest and the line follow an arcuate or non-linear path.

More preferably the feature of interest is a rib of the subject.

In an embodiment, the step of generating includes obtaining a series of sets of image data along the line; and using the series to generate the projection image.

Preferably, the series is composed of sets of planes of image data orthogonal to the line along the feature of interest.

The method can further include obtaining a segmentation of the feature of interest, and generating a plurality of projection images along the line, delineated by the segmentation of the feature of interest.

In embodiments, the projection image is generated from functional imaging data of the subject, and the method further includes displaying as the enhanced image a combination of: anatomical imaging data of the subject; and the projection image.

Preferably, the method further includes displaying in the enhanced image a projection image for the feature alongside the feature in the anatomical imaging data.

More preferably, the projection image generated from the functional imaging data is combined with anatomical imaging data along the line, and this combination is displayed alongside the feature in the anatomical imaging data.

Suitably, the method further includes repeating the generation of the projection image for a plurality of elongated features in the imaging data.

In one embodiment, the method further includes recording a finding of an anomaly for the feature of interest where a value for the projection image exceeds a threshold.

For example, the value may be an SUV or other intensity measure, signifying a hot-spot in that projection image.

Preferably, the anomaly is recorded as a lesion in the rib. In one embodiment, the method further includes, for a finding of a lesion in a given rib, recording for the finding one or more of: a side of the given rib, a number of the given rib, a segment of the rib or image volume in which the lesion is found, a distance to the spine of the subject, and an angle between a subject axis and the lesion finding.

Suitably, the segmentation is performed on functional imaging data of the subject, and the method further includes comparing the segmentation with the finding of an anomaly.

The invention also encompasses apparatus for generating an enhanced image for display from medical imaging data of a subject, having a processor configured to determine a feature of interest in the imaging data elongated in at least one dimension, obtain a location of a line through the imaging data along the feature of interest, and generate from the imaging data a projection image along the line, and a display device, with the processor being configured to cause the projection image to be displayed at the displaying device.

In embodiments of the invention, functional imaging data may be obtained from modalities such as PET or SPECT, and anatomical imaging data from modalities such as CT or MRI.

The above object also is achieved in accordance with the present invention by a non-transitory, computer-readable data storage medium encoded with programming instructions that, when the storage medium is loaded into a computerized control and evaluation system are an imaging apparatus, cause the computerized control and evaluation system to operate the imaging apparatus according to any of the above-described embodiment of the inventive method.

The above embodiments may be combined to provide further aspects and embodiments of the invention.

BRIEF DESCRIPTION OF THE DRAWINGS

FIG. 6b is a schematic diagram of FIG. 6a.

FIG. 7 illustrates a location recording step according to an embodiment of the invention.

DESCRIPTION OF THE PREFERRED EMBODIMENTS

When the following terms are used herein, the accompanying definitions can be applied:
PET—Positron Emission Tomography
SPECT—Single-photon emission tomography
SUV—Standardised Uptake Value
FDG—F-18 fluorodeoxyglucose, a PET radiotracer
NaF—Sodium fluoride
Tc—Technetium
MIP—Maximum Intensity Projection (or Minimum Intensity Projection, usually denoted MinIP)
MRI—Magnetic Resonance Imaging
ROI/VOI—Region/volume of interest.
Segmentation—the process of labelling voxels as belonging to different classes. For example, in a medical image, each voxel may be labelled according to its tissue type.
CT—Computed Tomography
MPR—Multi-Planar Reconstruction
CAD Computer-aided diagnosis Embodiments of the invention present methods for enhanced visualizations, automatic/interactive reporting, and follow-up examinations.

Embodiments of this invention enable the reading physician to easily and efficiently assess which ribs are affected by lesions and to interactively/automatically report the locations of each finding, even in the presence of multiple lesions. Furthermore, they enable the automatic identification of corresponding lesions among different studies from the same patient.

The following describes embodiments of the invention including a system and methods for efficient rib lesion reading, including methods for advanced visualization, detection, reporting, and follow-up. In particular it improves on previous 2D visualization techniques for rib analysis by PET/SPECT imaging and furthermore introduces new visualization techniques that benefit from the high contrast between lesions and non-lesions in molecular imaging and hence allow a fast assessment of all lesions along each rib. Once a lesion has been detected (manually, semi-automatically, or fully-automatically) its location can be automatically reported. Moreover, the location of each finding can be easily re-visited in follow-up studies, e.g., for comparison purposes. Overall, the described embodiments are expected to significantly improve the workflow of multimodal bone readings with focus on rib lesions.

Figure 2:
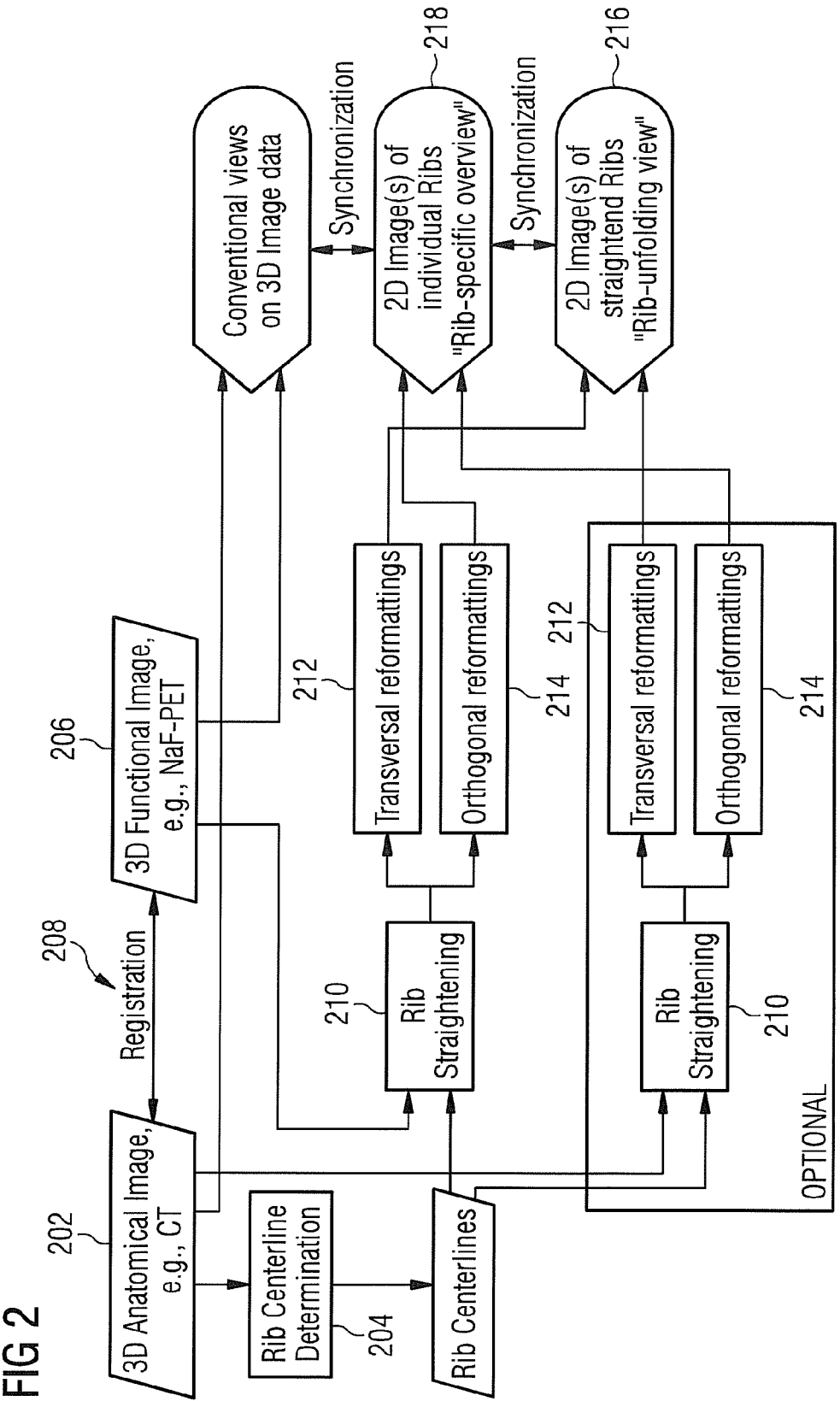
FIG. 2 shows steps of a method according to an embodiment of the invention.

The basics of the proposed first embodiment of the system are sketched in the flowchart in FIG. 2.

The first input is one anatomical 3D image (202) of the chest that is used for extraction of the rib centerlines (204) and optionally a binary segmentation of the different ribs. Preferably this input is a CT image, which allows the extraction of rib centerlines/binary masks using for instance a method based on that described in Sowmya Ramakrishnan, Christopher Alvino, Leo Grady, and Atilla Kiraly, "Automatic Three-Dimensional Rib Centerline Extraction from CT Scans for Enhanced Visualization and Anatomical Context," SPIE Medical Imaging 2011, 7962, pp. 79622x.

Note that once the rib centerlines are available, this input is not mandatory.

The second input consists of one or more functional images (206—PET, SPECT, MRI). If the modality is a type of molecular imaging (e.g., PET), different radiotracers such as 18F—NaF or 18F-FDG, may be used for imaging.

The second input shall be aligned to the first input either by means of simultaneous acquisition or by means of a registration algorithm (208). In case of follow-up studies, both inputs should be available for the different time-points. Note, however, that the image data does not need to be aligned across time-points.

Figure 1:
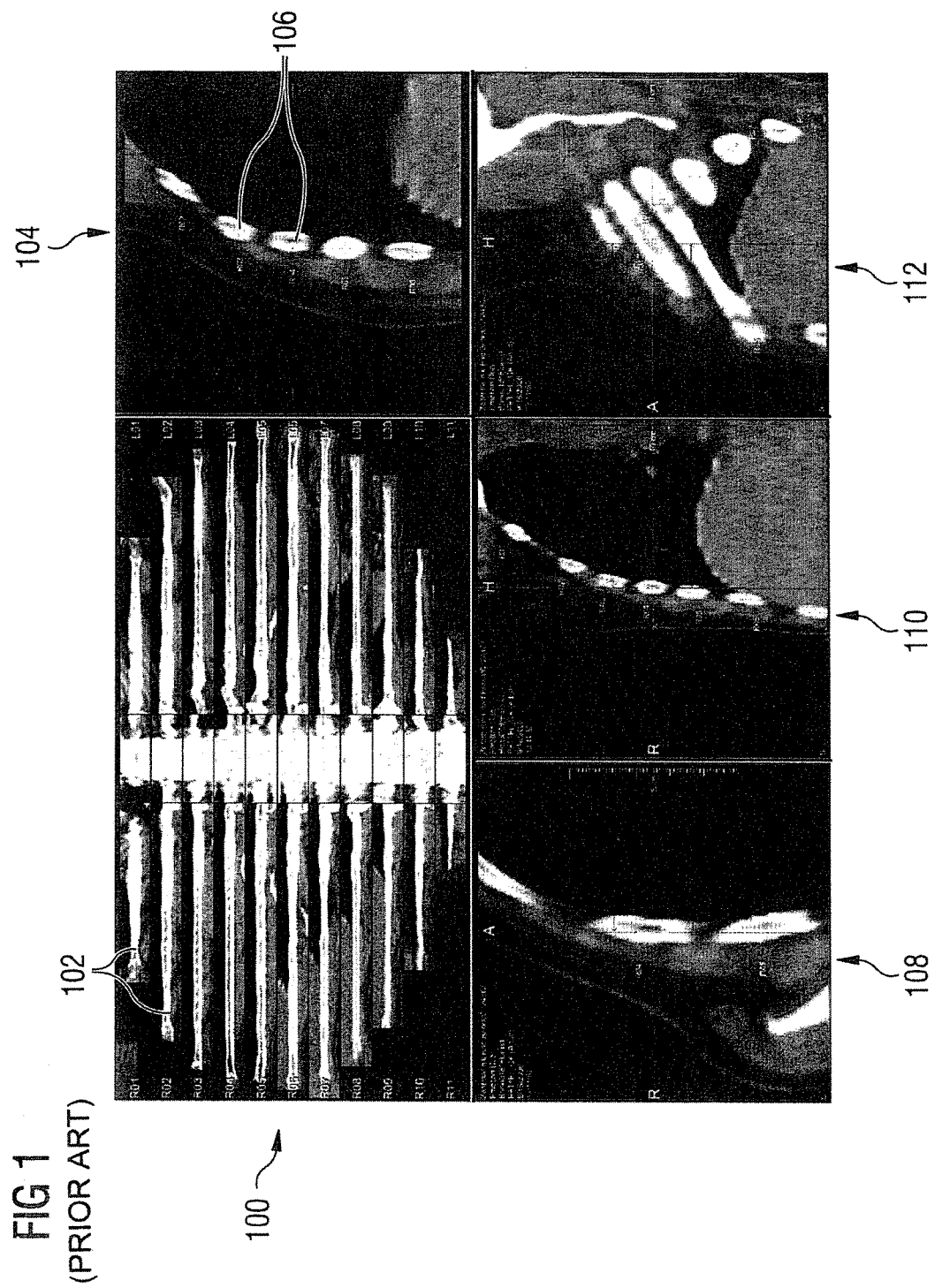
FIG. 1 illustrates a known visualisation method.

Then, each rib is straightened (210) to create for instance a rib unfolding view similar to that displayed for CT only in FIG. 1. With more than one input image, the same process is repeated for each individual input. Next, 2D reformattings are computed for the centerline (CPR) (transversal—212) and cross-sectional (orthogonal—214) to the centerline (MPR). These are used for enhanced visualization and navigation as described in detail in the next subsections.

The transverse images can then be used as basis for an enhanced rib unfolding visualization (216), whereas the orthogonal images are used for rib-specific visualization (218). The different views are then combined with conventional viewing techniques into one system that allows the efficient navigation to potential lesions and synchronizes the different views for better assessment.

Moreover, each individual rib can be further subdivided into different segments based on some anatomical feature that can be utilized to automatically describe findings based on the rib of occurrence and the position along the rib. Finally, reported lesions can be linked to corresponding lesions in follow-up studies based on this information, for instance for quantitative analyses, without the necessity of aligning the input data across time-points.

Figure 3:
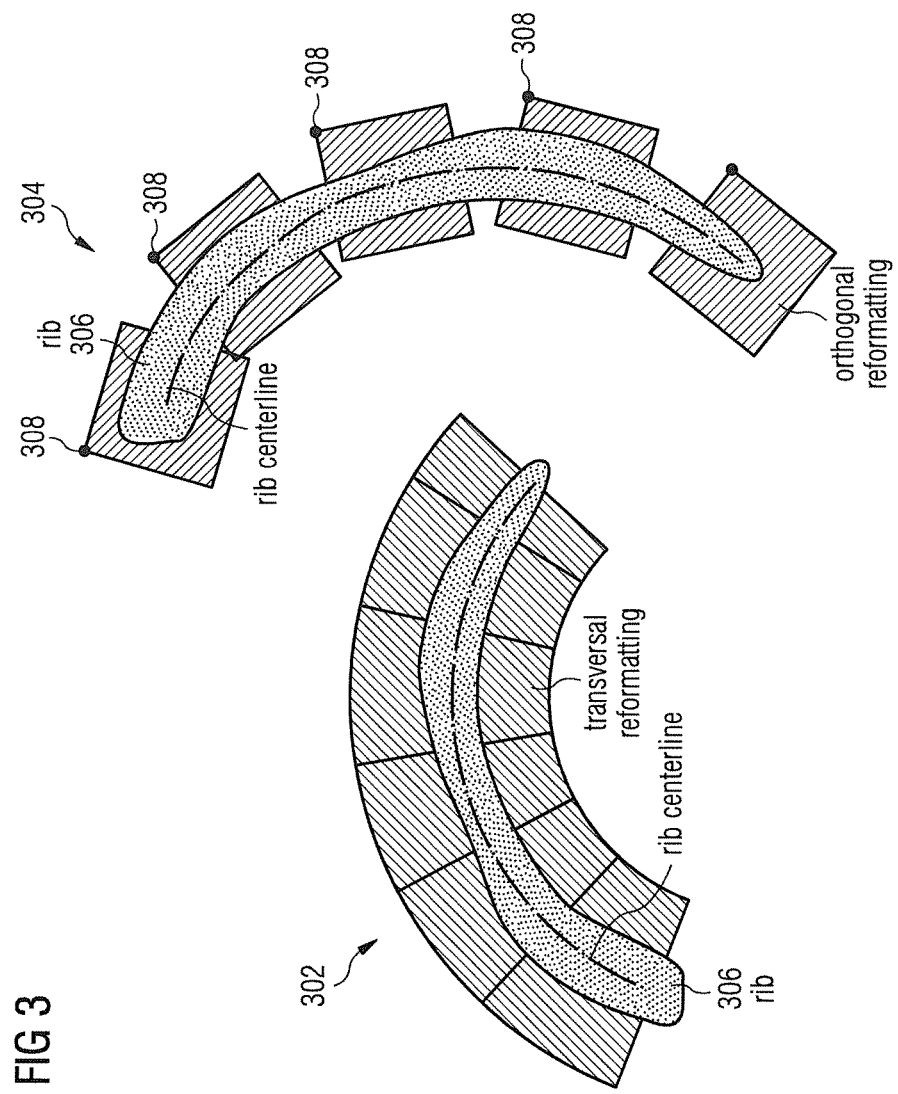
FIG. 3 illustrates a rib reformatting step according to an embodiment of the invention.

FIG. 3 is a diagram illustrating the rib reformatting step, transversal plane images on the centerline (302) and multiple orthogonal reformattings cross-sectional (304) along the centerline of the sketched 3D rib (306). Note particularly that the indicated dot (308) in the top right hand corner of each cross-sectional plane is located at identical 2D coordinates. That is, if considering the different planes along the centerline as one stack of slices, a projection such as MIP would compute the maximum value of all these points and store it at corresponding location in the resulting 2D image.

Figure 4:
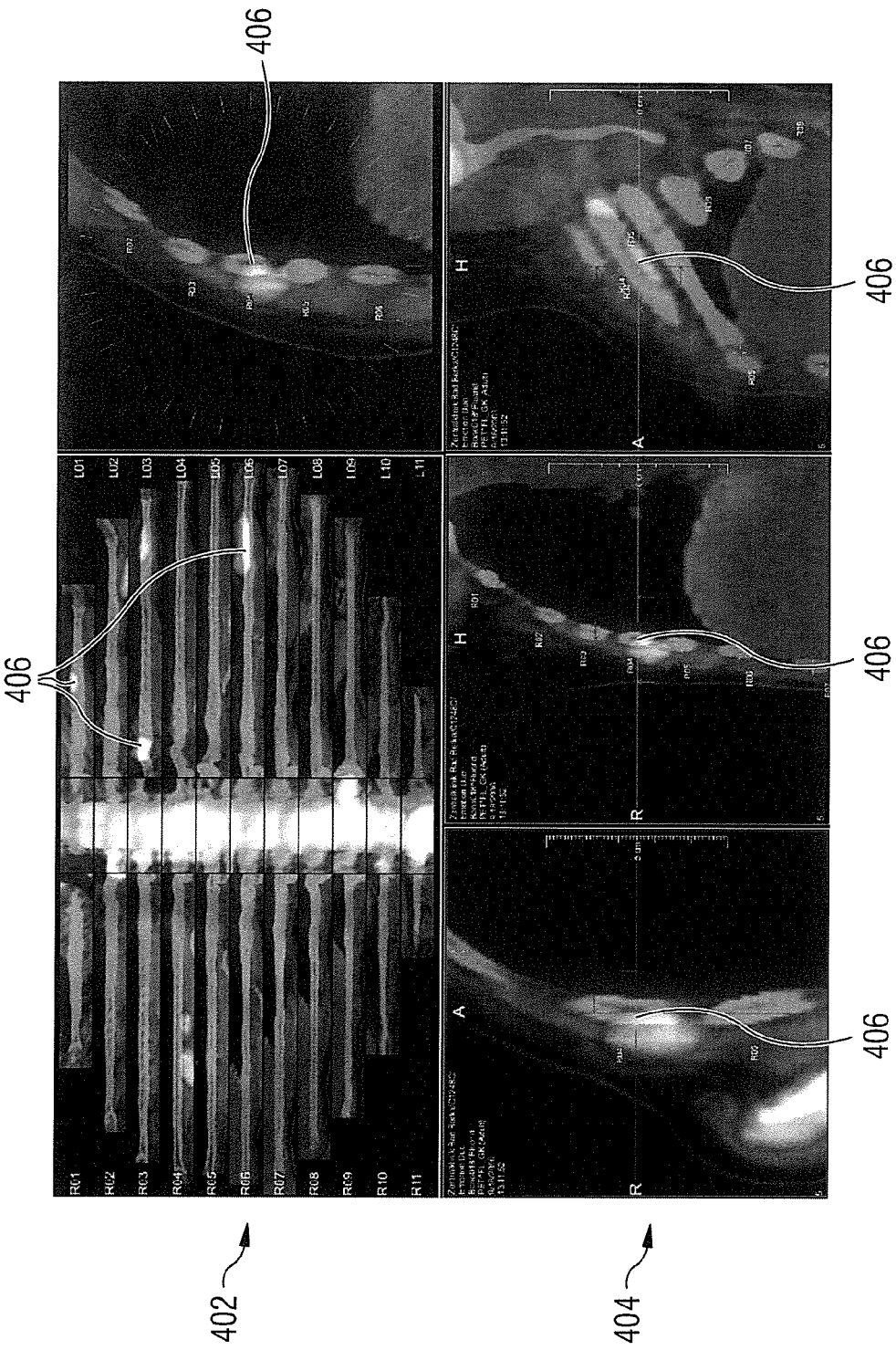
FIG. 4 illustrates a combined view of functional and anatomical image data according to an embodiment of the invention.

In an initial embodiment, an enhanced visualization of the results is presented. By synchronizing the rib straightening and reformatting steps between different modalities, the existing system as shown in FIG. 1 can be extended by, e.g., functional overlays as exemplarily shown in FIG. 4, in which the different anatomical views (402, 404) are this time fused with functional information using color-coded overlays. This example shows the 2D views of a 3D NaF-PET image as color-coded overlay, whereas the geometry of the overlay exactly matches the geometry of the underlying CT image. Note the improved visibility of potential rib lesions (406) as compared to FIG. 1, due to the good contrast of the utilized NaF-PET scan.

Beyond that, it is also possible to create multiple successive functional reformattings and to compute a projection (e.g., MIP) along the resulting stack of computed 2D images. That is, the value of each overlay pixels then corresponds to the, e.g., maximum intensity value of a small range along the view of sight (a so-called "thin-slice MIP"). Furthermore, such projections can be limited to a binary mask of the rib structures, if existent. It is clear that all described overlay techniques can be also visualized without the corresponding functional images. Using this technique significantly improves the visibility of potential lesions.

A main embodiment of this invention provides a rib-specific visualization that allows the identification of ribs that are affected by a lesion at a glance. To this end, the orthogonal reformattings (shown in FIG. 3) along each single rib are collected and projected into a 2D image along the centerline. For example, FIG. 5 shows ribs (502) with and without findings utilizing an average projection for the anatomical (CT) data and a maximum intensity projection for the functional (PET) data (cf., FIG. 3).

Figure 5A:
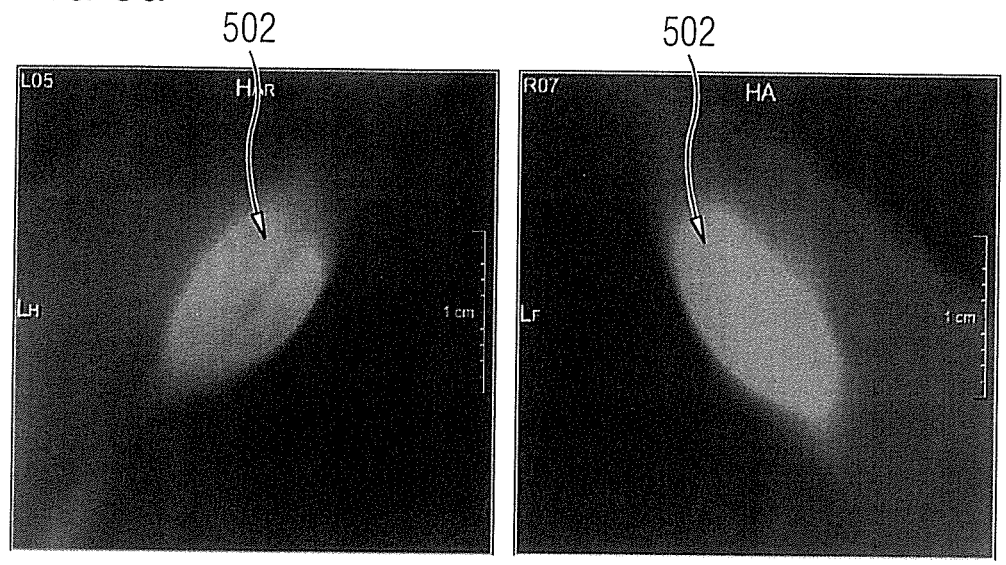
FIGS. 5a and 5b are sets of diagrams illustrating combined rib-specific functional and anatomical image data according to embodiments of the invention.
Figure 5B:
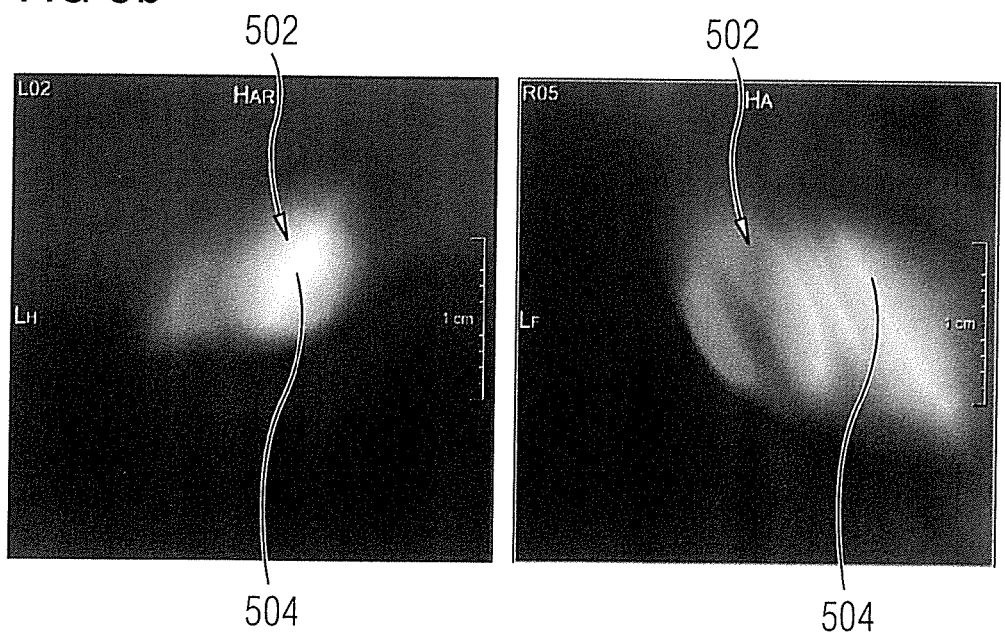
Figure 6A:
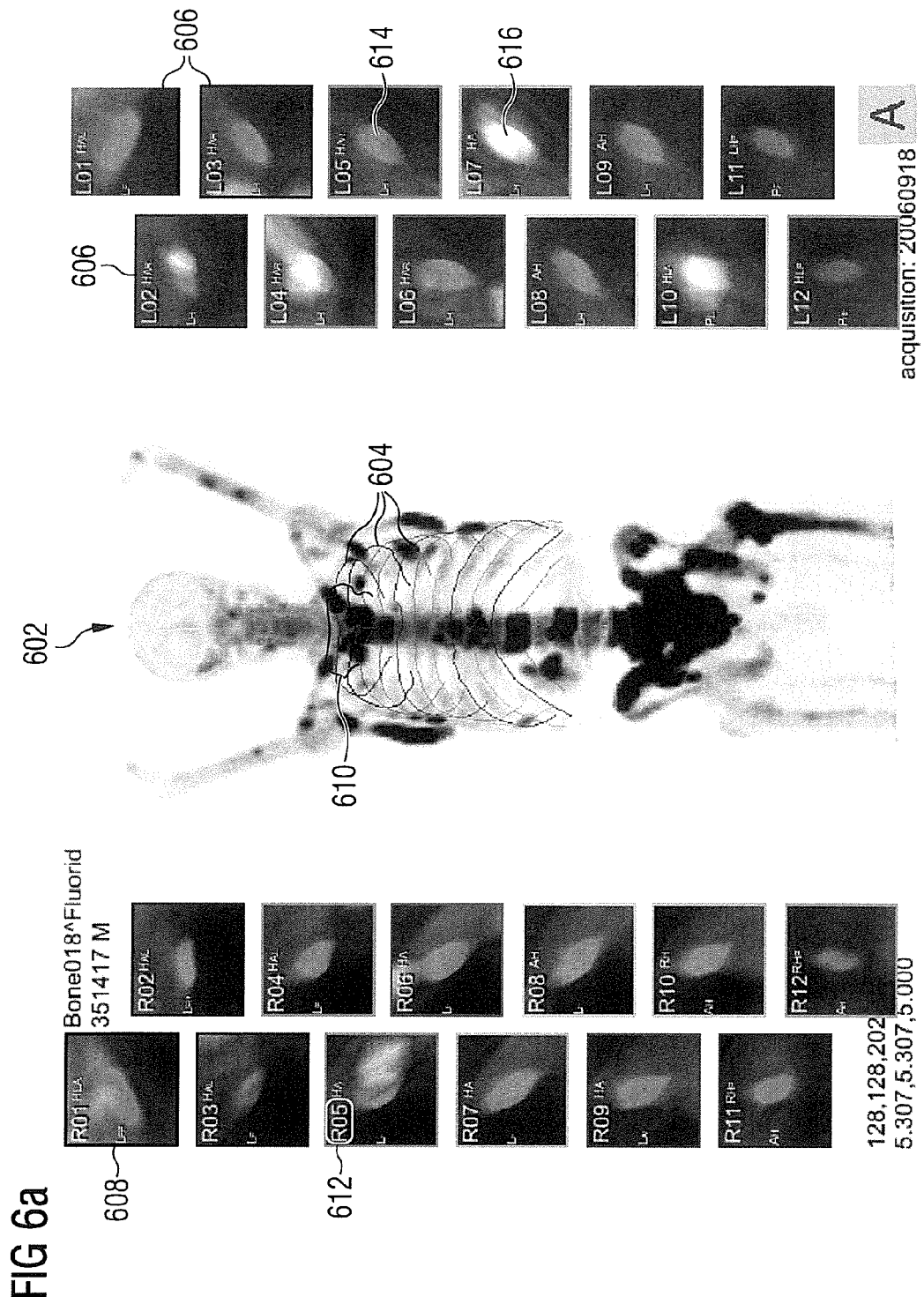
FIG. 6a is an example of a visualization of the images of FIGS. 5a and 5b.

FIGS. 5a and 5b show 2D images of specific ribs ("rib patches") with (FIG. 5b) and without (FIG. 5a) lesions. For each rib (502), the anatomical (CT) information is projected along the rib centerlines using an average value while the coloured overlay corresponds to a MIP of the functional (PET) data. Note that the user can easily see if a particular rib features a high uptake (504). Moreover, in the presence of multiple hot-spots per rib, this could be indicated by adding the number of hot-spots as additional overlay to the 2D image. The user could then, e.g., "jump" from one hot-spot to the next along one rib by clicking multiple times on the corresponding 2D image Again, such projections can be limited to a binary mask of the rib structures, if existent. Such "rib patches" could for instance be combined with a MIP of the PET data as shown in FIG. 6a. Additionally, correspondences between the global MIP and the rib-specific MIPs can be established using a color-coding scheme.

FIG. 6a is an example visualisation for the complete set of rib-specific CT and MIP combinations shown in FIGS. 5a and 5b. The conventional MIP (602) of the PET data can be augmented by color-coded rib centrelines (604). For each rib, the rib-specific MIP (606) is shown as overlay to average CT projections along each centreline, as in FIGS. 5a and 5b. Furthermore, each resulting "rib patch" can be color-coded according to the color of the displayed centerlines and labelled—for example, rip-specific combination 608 is outlined in yellow, to color-code with the outline of this rib 610 on the main MIP view 602.

As in FIGS. 5a and 5b, the presence (616) or absence (614) of a hotspot in the projection image/CT combination along the given rib can be clearly seen in FIG. 6a.

In the shown example, each rib centerline is visualized in a color that corresponds to the color of the frames of each individual rib patch. Additionally, rib labels (612) are displayed for each rib patch.

The navigation can be synchronized between all previously described views. Particularly, if selecting a position along a rib in the rib unfolding view or in the MIP, the corresponding rib patch can be highlighted. Vice versa, clicking on a rib patch, corresponding position can be highlighted in the different other views.

Moreover, a hot-spot detection or CAD algorithm can be applied to each resulting stack of orthogonal reformattings. The result of such an algorithm can be integrated into the described system by, e.g., displaying the number of detected lesions along each rib as additional label. Then, the user could for instance automatically "jump" between different lesions/hot-spots along a particular centerline by clicking multiple times onto the corresponding rib patch.

Figure 6B:
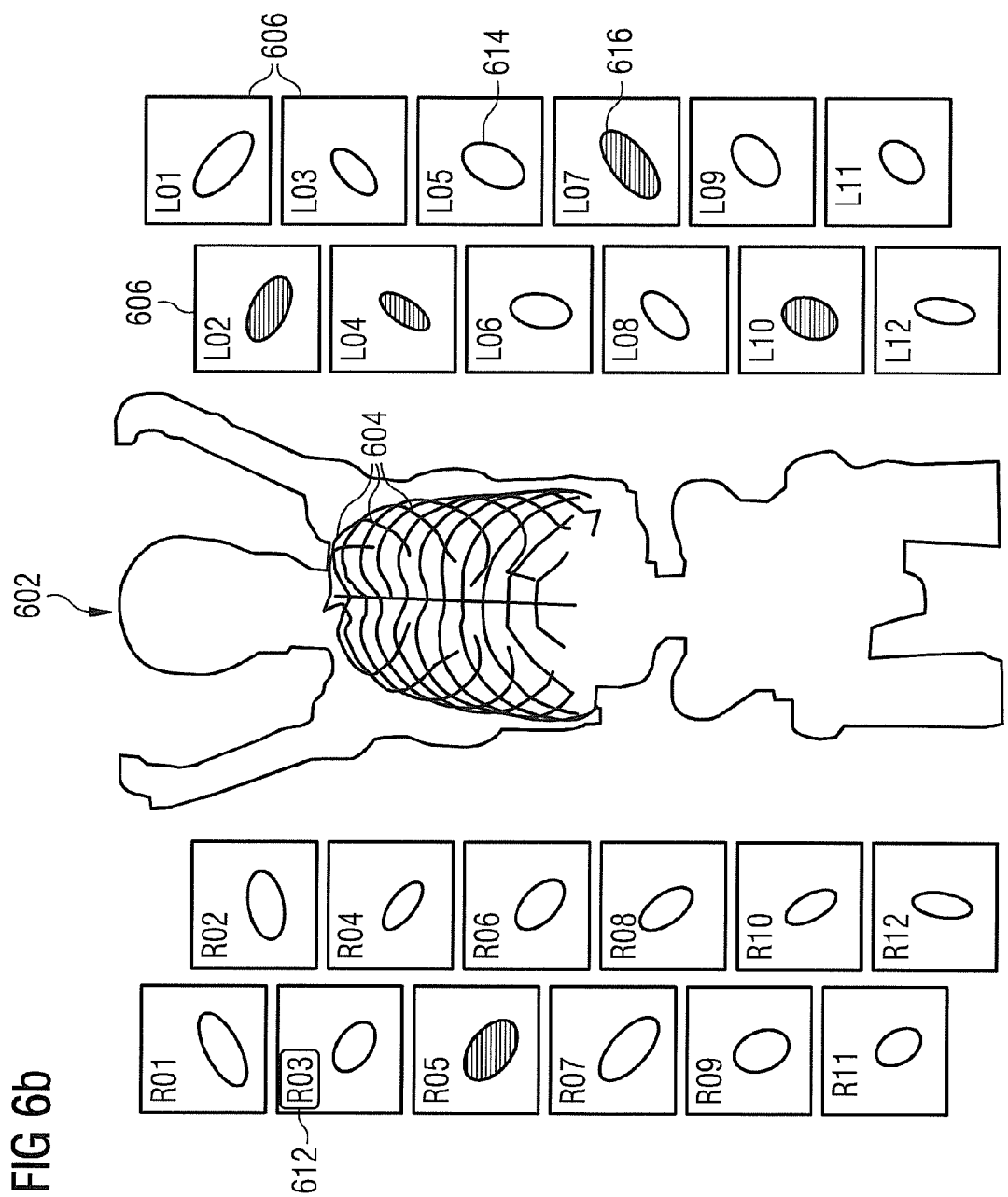

FIG. 6b is a schematic version of FIG. 6a—hotspots 616 and ribs without hotspots 614 are indicated by the darkened (616) or normal (614) rib specific views.

Figure 8:
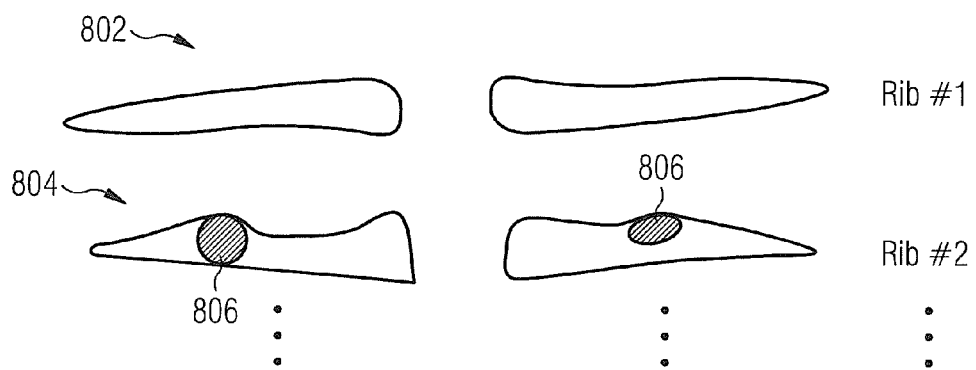
FIG. 8 illustrates a location recording step according to an embodiment of the invention.

FIG. 8 is a schematic diagram of unfolded ribs (802, 804). It depicts a plurality of labelled ribs using extracted rib centrelines and corresponding CT information for the unfolded visualization. Rib #2 indicates two PET/SPECT hotspots (806) as overlay on top of the anatomical information.

Once a finding has been located either manually, semi-automatically, or fully automatically, its location can be reported based on the extracted centerline information. The report of each finding can automatically include the side/number of each rib and also the location along each rib. To this end, the ribs may be further divided into different segments, e.g., using landmarks such as midclavicular line, anterior/mid/posterior axillary line, and scapular line. Such segments can be either detected or approximated by the angle (706) between finding and spine (704) as exemplarily outlined in FIG. 7.

FIG. 7 is an axial image (700) of a chest showing spine (704) and ribs (702). A particular finding along the centerline of a rib can be encoded for instance based on the rib and the angle (706) between spine (704) or some axis (708) and the finding, or based on a the distance to the spine/axis.

To relocate a reported finding in a follow-up study, each finding can be (internally) stored using a more detailed description of its location. Instead of saving just the rib segment in which a lesion is located, its detailed position (e.g., distance to spine, angle between finding and spine, etc.) can be stored. With such information being available, it is straightforward to link lesions between different timepoints even without any registration between the datasets. This also allows a detailed comparison between them, e.g., lesion sizes using a lesion segmentation algorithm.

All this information together could be exported into a detailed report or into some dedicated file format that can be interpreted by, e.g., a therapy planning system.

The rib-specific MIP/CT combinations presented alongside the whole body PET MIP (as shown in FIG. 6) allow the user to quickly identify which ribs contain lesions and facilitate navigation. However, this can be done in projections along other anatomical features such as the spine, or major vessels. Furthermore, alternative 2D projections along the centerline may be used to generate the summary image.

Figure 9:
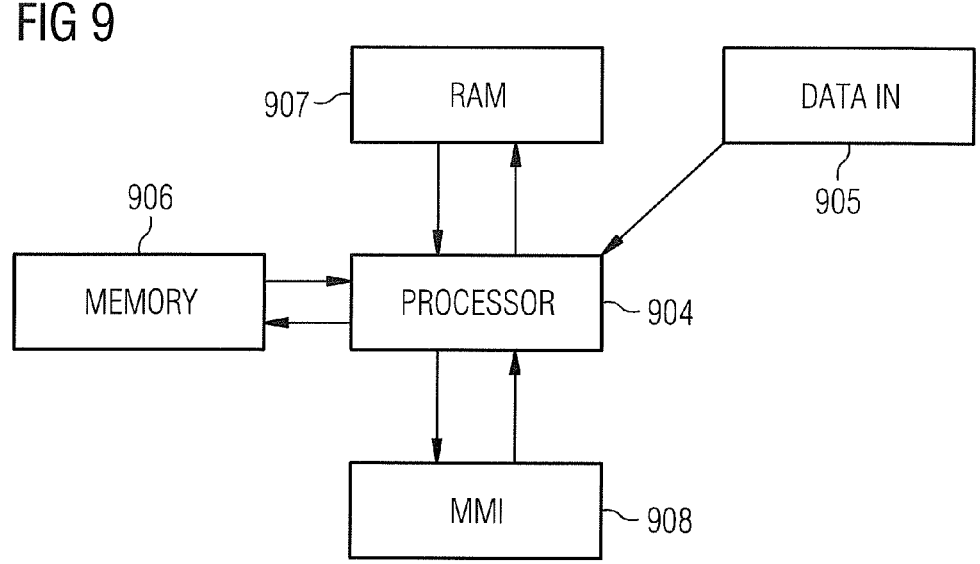
FIG. 9 illustrates an apparatus according to an embodiment of the invention.

Referring to FIG. 9, the above embodiments of the invention may be conveniently realized as a computer system suitably programmed with instructions for carrying out the steps of the methods according to the invention.

For example, a central processing unit 904 is able to receive data representative of medical scans via a port 905 which could be a reader for portable data storage media (e.g. CD-ROM); a direct link with apparatus such as a medical scanner (not shown) or a connection to a network.

Software applications loaded on memory 906 are executed to process the image data in random access memory 907.

The processor 904 in conjunction with the software can perform the steps such as determining a feature of interest in the imaging data elongated in at least one dimension, obtaining a location of a line through the imaging data along the feature of interest, and generating from the imaging data a projection image along the line.

A Man—Machine interface 908 typically includes a keyboard/mouse/screen combination (which allows user input such as initiation of applications) and a screen on which the results of executing the applications are displayed.

Although modifications and changes may be suggested by those skilled in the art, it is the intention of the inventor to embody within the patent warranted hereon all changes and modifications as reasonably and properly come within the scope of their contribution to the art.

We claim as our invention:

1. A method for generating an enhanced image for display from medical imaging data of a subject, comprising:
    in a processor provided with medical imaging data, automatically determining a feature of interest in said medical imaging data that is elongated in at least one dimension;
    in said processor, automatically identifying a location of a line that proceeds through said feature of interest along said at least one dimension in which said feature of interest is elongated in said medical imaging data; and
    in said processor, generating a projection image from said medical image data as a non-cross-sectional view along said line from an end of said line by generating a series of sets of image data along said line as a plurality of sets of planes of image data that are respectively orthogonal to said line along said feature of interest, and using said series to generate said projection image, and making said projection image with said view available in electronic form at an output of said processor.

2. A method as claimed in claim 1 comprising generating said projection image as a two-dimensional, maximum intensity projection image.

3. A method as claimed in claim 1 comprising identifying said line as a centerline along said feature of interest.

4. A method as claimed in claim 1 wherein said feature of interest and said line follow an arcuate or non-linear path.

5. A method as claimed in claim 1 wherein said feature of interest is a rib of said subject.

6. A method as claimed in claim 1 comprising:
    implementing a segmentation of said feature of interest from said medical imaging data; and
    generating a plurality of projection images along said line, delineated by the segmented feature of interest.

7. A method as claimed in claim 1 wherein said medical imaging data are functional imaging data, and comprising:
    displaying an enhanced image comprising a combination of anatomical imaging data of the subject and said projection image.

8. A method as claimed in claim 7 comprising displaying, in said enhanced image, a projection image for said feature next to said feature in said anatomical imaging data.

9. A method as claimed in claim 8 comprising combining the projection image generated from said functional imaging data with anatomical imaging data along said line, to produce a combined image, and displaying said combined image next to said feature in said anatomical imaging data.

10. A method as claimed in claim 1 comprising repeatedly generating said projection image for a plurality of different elongated features in said medical imaging data.

11. A method as claimed in claim 1 comprising generating a finding of an anomaly for said feature of interest at a location in said projection image where a value associated with said projection image exceeds a threshold.

12. A method as claimed in claim 11 wherein said feature of interest is a rib of the subject, and wherein said anomaly is recorded as a lesion in said rib.

13. A method as claimed in claim 12 comprising repeatedly generating said projection image for a plurality of different ribs of the subject and, upon recording a finding of a lesion in one of said ribs, representing said finding as at least one a side of said one of said ribs, a number of said one of said ribs, a segment of said one of said ribs, an imaging volume of said one of said ribs in which said lesion is located, a distance of the lesion to the spine of the subject, and an angle between an axis of the subject and said lesion.

14. A method as claimed in claim 1 comprising segmenting said feature of interest from functional imaging data of the subject;
    generating a plurality of projection images along said line, delineated by the segmented feature of interest;
    recording a finding of an anomaly course of feature of interest at a location in at least one of said projection images where a value of said at least one of said projection images exceeds a threshold; and comparing the segmented feature of interest with said finding of said anomaly.

15. An apparatus for generating an enhanced image for display from medical imaging data of a subject, comprising:
   a processor provided with medical imaging data, configured to automatically determine a feature of interest in said medical imaging data that is elongated in at least one dimension;
   said processor being configured to automatically identify a location of a line that proceeds through said feature of interest along said at least one dimension in which said feature of interest is elongated in said medical imaging data;
   said processor being configured to generate a projection image from said medical image data as a non-cross-sectional view along said line from an end of said line by generating a series of sets of image data along said line as a plurality of sets of planes of image data that are respectively orthogonal to said line along said feature of interest; and
   a display device in communication with said processor, said processor being configured to cause said projection image with said view to be displayed at said display device.

16. A non-transitory, computer-readable data storage medium encoded with programming instructions, said storage medium being loadable into a processor that is provided with medical imaging data of a subject, and said programming instructions causing said processor to:
   automatically determine a feature of interest in said medical imaging data that is elongated in at least one dimension;
   automatically identify a location of a line that proceeds through said said feature of interest along said at least one dimension in which said feature of interest is elongated in said medical imaging data; and
   generate a projection image from said medical image data as a non-cross-sectional view along said line from an end of said line by generating a series of sets of image data along said line as a plurality of sets of planes of image data that are respectively orthogonal to said line along said feature of interest, and make said projection image with said view available in electronic form at an output of said processor.

* * * * *